United States Patent [19]

Kugler

[11] Patent Number: 4,549,577
[45] Date of Patent: Oct. 29, 1985

[54] FEMALE COUPLER FOR A FLUID CIRCUIT

[75] Inventor: Uwe H. Kugler, Cedar Falls, Iowa

[73] Assignee: Deere & Company, Moline, Ill.

[21] Appl. No.: 699,755

[22] Filed: Feb. 11, 1985

[51] Int. Cl.[4] .............................................. F16L 37/00
[52] U.S. Cl. ............................ 137/614.04; 137/614.05
[58] Field of Search ............. 137/614, 614.04, 614.05, 137/614.06

[56] References Cited

U.S. PATENT DOCUMENTS

| | | | |
|---|---|---|---|
| 2,735,696 | 2/1956 | Omon et al. | 137/614.05 |
| 3,500,859 | 3/1970 | Pearson | 137/614.05 |
| 3,550,624 | 12/1970 | Johnson | 137/614.05 X |
| 4,249,572 | 2/1981 | Shindelar et al. | 137/614.04 |
| 4,303,098 | 12/1981 | Shindelar | 137/614.06 |

Primary Examiner—A. Michael Chambers
Assistant Examiner—John C. Fox

[57] ABSTRACT

A female coupler for engagement with a male coupler which has a spring loaded check valve, the female coupler includes a main poppet valve biased to a normally closed position and movable by the check valve in the male coupler to a fully opened position, a piston responsive to fluid pressure in the female coupler to force the main poppet valve to an intermediate position and open the male coupler check valve, a flow check prevention valve for normally maintaining a predetermined pressure of the fluid acting on the piston, and a second poppet valve to relieve the fluid acting on the piston.

5 Claims, 2 Drawing Figures

FEMALE COUPLER FOR A FLUID CIRCUIT

FIELD OF THE INVENTION

This invention relates, generally, to a female coupler which is used in conjunction with a male coupler to joint portions of a fluid circuit.

BACKGROUND OF THE INVENTION

In many fluid circuits, such as the hydraulic circuit in an agricultural tractor, provision is made to add and remove remote functions such as a hydraulic cylinder on an implement attached to the tractor to the main hydraulic system. This provision for adding or subtracting is usually in the form of a female coupler which will receive a male coupler on the end of a hydraulic line leading to the remote function. Examples of such female couplers are shown in co-pending U.S. application Ser. No. 696,542 filed on Jan. 30, 1985 by Kugler et al as a continuation of Ser. No. 438,120 filed on 1 Nov. 1982 and U.S. Ser. No. 491,519 filed on 4 May 1983 by Kugler. Both of the co-pending applications referred to disclose a female coupler which provides for easy coupling to a male coupler which may be under pressure due to either thermal expansion or a load on the remote function to which the male coupler is attached, has provision to utilize fluid pressure to forceably open the check valve of the male coupler which may be under pressure, and incorporates a flow check valve which will prevent the check valve of the male coupler from closing should the coupled male and female couplers be subjected to alternate surges of vacuum and pressure.

The female coupler disclosed in the aforementioned co-pending U.S. application Ser. No. 696,542 was an improvement over previous couplers in that it incorporated the flow check valve for preventing unwanted closure of the check valve in the male coupler, and the coupler disclosed in the aforementioned co-pending U.S. application Ser. No. 491,519 was an improvement over the other in that it incorporated a much simplified and inexpensive flow check valve. However, the couplers disclosed in both of the aforementioned co-pending U.S. applications required many parts to perform all the functions and were thus expensive to manufacture, were difficult to assemble and disassemble thus making repair so expensive that they were considered nonrepairable and, due to the large number of parts which could result in tolerance buildup, were subject to valve binding.

SUMMARY OF THE INVENTION

This invention relates to a female coupler and has for its object to provide a female coupler which retains all the desirable features present in prior art couplers but which has fewer parts, is less expensive to manufacture, is easily repairable and eliminates the problems of valve binding present in the prior art.

Another object of the present invention is to provide an improved female coupler which is retrofittable to existing coupler housings, that is, if an old coupler needs to be replaced the improved coupler according to the present invention can be used in the same housing and same location as the old coupler was used.

The above objects and additional objects and advantages of the present invention will become apparent to those skilled in the art from a reading of the following detailed description when taken in conjunction with the accompanying drawings.

DETAILED DESCRIPTION OF THE PREFERRED EMBODIMENT

In the following description, and for purposes of convenience only and not by way of limitation, the viewers right will be taken as the right-hand side of the female coupler to be described.

Figure 2:
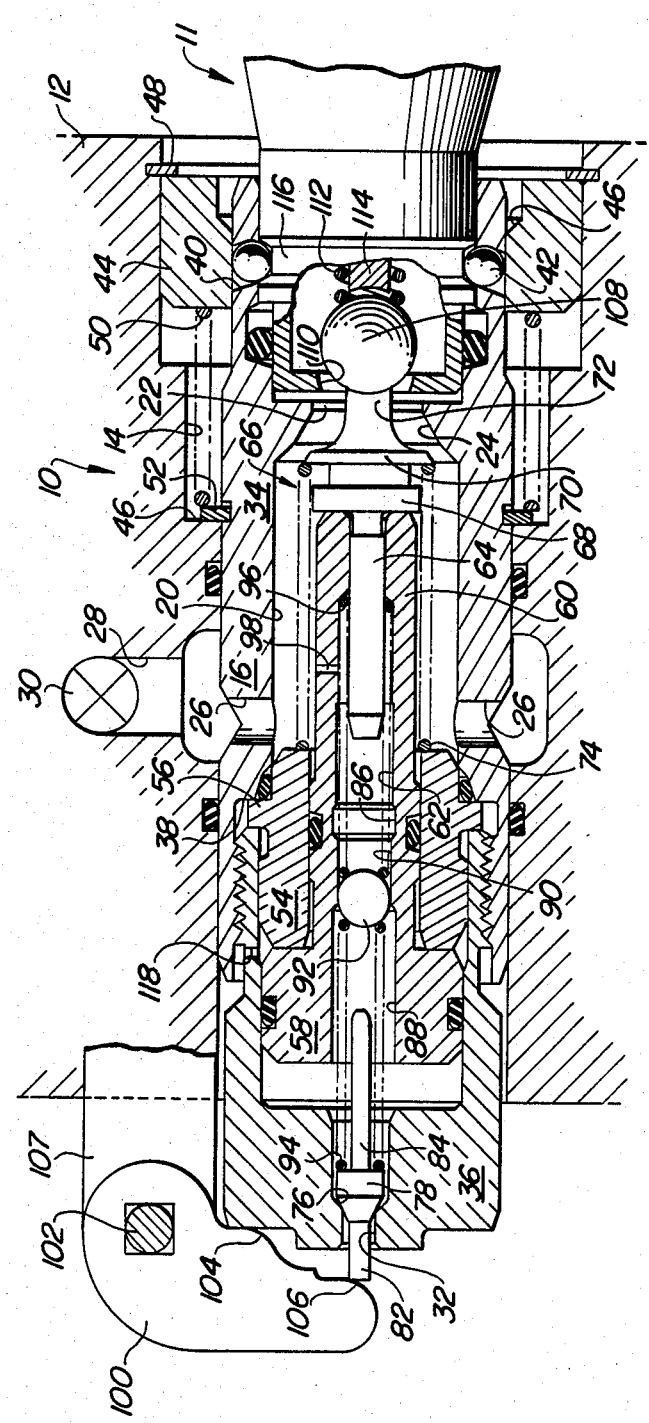
FIG. 2 is a view similar to FIG. 1 but showing a male coupler connected to the female coupler.

Referring to the drawings, a female coupler is indicated generally by the reference numeral 10 and it is adapted to receive a male coupler indicated generally by the reference numeral 11 (see FIG. 2). The female coupler includes a housing 12 having a bore 14 formed therein which is open at both ends. Slidably positioned within the bore 14 is a receptacle 16 which has an engagement bore open to one open end of the housing and into which the male coupler 11 may be inserted, a main bore 20, and a passageway 22 which interconnects the engagement bore with the main bore. The internal surface of the receptacle is provided with a tapered surface 24 which forms a valve seat. The receptacle is also provided with an inlet port or ports 26 which is in constant communication with a fluid passageway 28 provided in the housing 12. The passageway 28 will typically contain a control valve 30 which will control the flow of pressurized fluid to or the exhaust of fluid from the receptacle main bore or block both the flow of fluid to and from the main bore as will be well understood by those skilled in the art. The left-hand end of the receptacle 16 is closed except for an outlet port 32 provided in the end coaxially with the central axis of the receptacle.

The receptacle 16 is constructed from two parts, a main body 34 and an end cap 36. The main body 34 contains the engagement bore 18, the passageway 22, the right-hand portion of the main bore 20 and the inlet port 26. At its left-hand end, the bore in the main body 34 is stepped to provide a shoulder 38 which faces to the left. To the left of the shoulder 38, the main body 34 is internally threaded to receive an externally threaded portion of the end cap 36. The end cap 36 is generally cup-shaped and contains the outlet port 32 and a portion of the main bore 20. The external surface of the end cap 36 is stepped to have an area of reduced diameter adjacent its open end and this area of reduced diameter contains external threads for engagement with the internal threads on the main body member.

The receptacle 16 is provided with a plurality of sockets 40 which extend from the outer surface of the receptacle to the engagement bore. The sockets 40 are tapered and receive engagement balls 42. The taper of the sockets 40 permits a portion of the balls to extend into the engagement bore but prevents the balls from moving completely into the engagement bore. When the engagement balls 42 extend into the engagement bore, they are essentially flush with the outer surface of the receptacle. At its right-hand end the housing bore 14 is stepped to provide an enlarged area which is joined to the remainder of the housing bore by a shoulder 46. A retaining sleeve 44 is positioned in the enlarged area of the housing bore in a position overlying the engagement balls 42 to prevent displacement of the engagement balls. The internal surface of the retaining sleeve 44 has a small diameter portion which is joined by slanted race 46 with a large diameter portion. When the receptacle is in its normal position illustrated in the drawings, the small diameter portion of the internal surface of the retaining ring 44 engages the balls 42 and holds them in a position where they project into the engagement bore. When the receptacle is moved to the right from the position shown in the drawings, the balls 42 are free to move into the large diameter portion of the retaining ring so that they do not project into the engagement bore. The retaining sleeve 44 is maintained in position by a snap ring 48 which is engaged in a groove provided in the housing 12 and a spring 50 which acts between the retaining sleeve 44 and a snap ring 52 which is engaged in a groove provided in the outer surface of the receptacle 16. The spring 50 normally holds the receptacle in the position illustrated in the drawings by urging the snap ring 52 to the left into engagement with the shoulder 46 but permits rightward movement of the receptacle so that the engagement balls 42 are free to move into the large diameter portion of the sleeve 44.

A stop in the form of a sleeve 54 is located within the main bore 20 of the receptacle in a position overlapping both the main body and end cap of the receptacle. The sleeve 54 is provided with a flange 56 which extends outwardly from its outer surface intermediate the opposite ends thereof, and the flange 56 is engaged between the shoulder 38 and the right end of the end cap 36 to retain the sleeve 54 in a fixed position.

Figure 1:
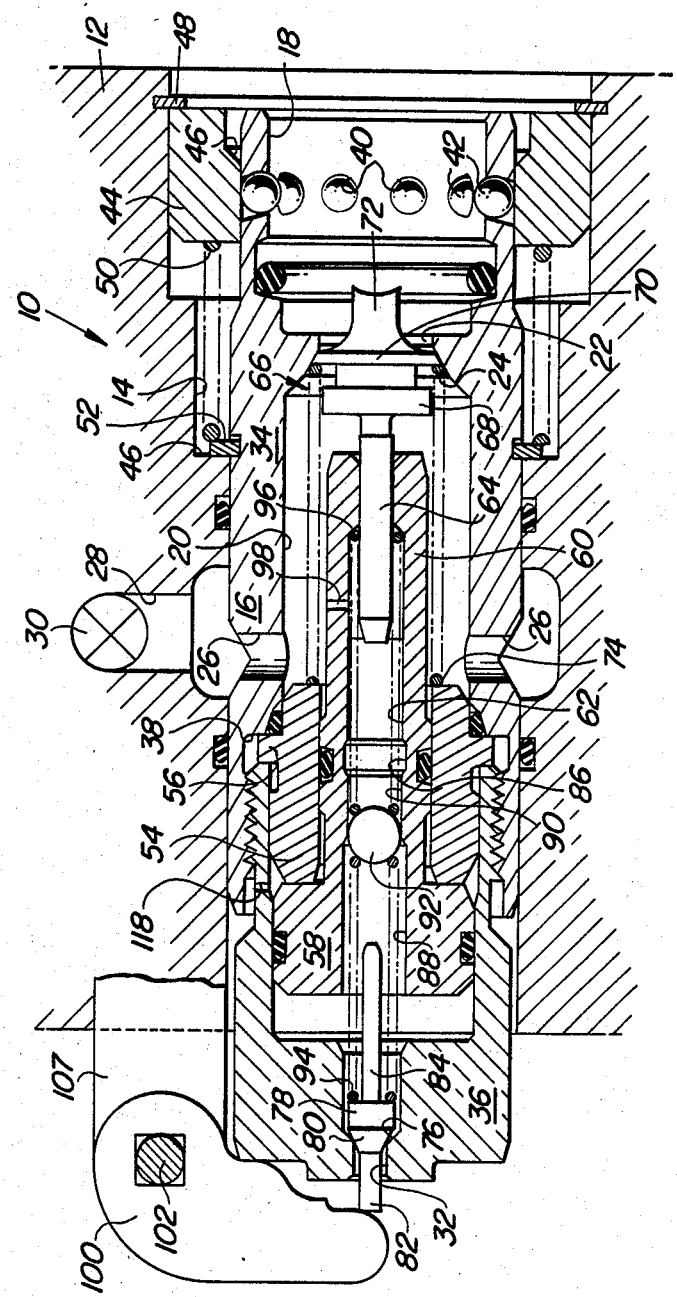
FIG. 1 is a cross-sectional view of a female coupler according to the present invention with the parts shown in the position they assume prior to having a male coupler coupled thereto.

A piston 58 is slidably mounted in the main bore for movement between the sleeve 54 and the closed left-hand end of the main bore. A rod 60 is integral with the piston 58 and slidably extends through the sleeve 54 and into that portion of the main bore to the right of the sleeve 54. The piston 58 and rod 60 are provided with a bore 62 which extends axially therethrough and is open at both ends. The right-hand end of the bore 62 is of reduced diameter and slidably receives the stem 64 of a main poppet valve indicated generally by the reference numeral 66. The main poppet valve 66 also has a head 68 which includes a tapered valving surface 70 which is adapted to engage the valve seat 24 and close off the passageway between the main bore 20 and engagement bore 18. A projection 72 on the head 68 opposite from the stem 64 projects through passageway 22 into the engagement bore. A spring 74 is positioned around the rod 60 and acts between the right-hand end of the sleeve 54 and the head of the poppet valve 66 to urge the poppet valve 66 toward the passageway 22 and causes engagement between the tapered valving surface 70 and the valve seat 24 as shown in FIG. 1. The fit between the poppet valve stem 64 and the reduced diameter portion of the bore 62 can be relatively loose since it is only required to provide a general guidance of the poppet valve. This loose fit permits the use of a spring 74 which is of a relatively low spring rate since the spring only has to move the poppet valve to the closed position and is not required to hold the poppet valve closed against a fluid pressure. As will be more fully explained hereinafter, the use of the light spring 74 reduces the effort needed to connect a male coupler to the female coupler.

The outlet port 32 in the end cap 36 is in a form of a bore having two different internal diameters which are interconnected by a tapered conical surface 76 which forms a valve seat. The outlet port 32 is normally closed by a second poppet valve 78 whose head includes a tapered valving surface 80 which engages the valve seat 76 when the poppet 78 is in a closed position. Axial stems 82 and 84 extend from the head of the poppet valve 78 with the stem 82 projecting out the left end of the receptacle and the stem 84 projecting inwardly and into the bore which extends through the integral piston and rod 58, 60.

The bore 62 extending through the piston and rod 58, 60 is provided with an enlarged diameter area 86 intermediate the ends of the bore and with an enlarged area 88 adjacent the left-hand end thereof. The areas 86 and 88 of large diameter are separated by a land 90. A resilient ball 92 is positioned in the bore 62 in the area to the land 90 and is normally held in position by springs 94 and 96. The resilient ball 92 is constructed of a synthetic material, for example neoprene, and has an outside diameter slightly larger than the inside diameter of the bore 62 in the area of the land 90. The spring 94 acts between the second poppet 78 and the ball 92 to normally hold the second poppet in a closed position and urge the ball 92 to the right. Spring 94 is a relatively light spring, that is a spring having a low spring rate which exerts very little force on the resilient ball 92. The stem 84 on the second poppet valve 78, along with the walls of the bore 62, prevent the spring 94 from flexing laterally or buckling. The spring 96 acts against a shoulder in the bore 62 and the ball 92. The spring 96 is a relatively strong spring, that is a spring having a high spring rate, and is in a fully extended condition when the resilient ball 92 is in the position illustrated in the drawings. The resilient ball 92, springs 94 and 96, land 90 and the portions 86 and 88 of the bore 62 form a flow check prevention mechanism which will permit fluid flow through the bore 62 in a leftward direction at a much lower pressure than it will permit fluid flow in a rightward direction to the bore 62.

As will be more fully explained hereinafter, it is intended that fluid in the portion of the main bore to the right of the sleeve 54 pass through the bore 62 in the piston and rod 58, 60 to the left-hand end of the piston. To this end, a passage 98 extends through the piston to provide communication between the bore 62 and the portion of the main bore to the right of the sleeve 54. Passage 98 may be omitted if the fit between the stem 64 of the main poppet valve 66 and the reduced diameter portion of the bore 62 at the right-hand end thereof is sufficiently loose to permit fluid flow, albeit restricted, therebetween.

A lever-actuated cam 100 is pivotally mounted on the housing 12 by a pin 102. The cam 100 includes a receptacle lobe 104 and a second poppet lobe 106. A lever 107 is connected to the cam 100 and will cause rotation of the cam upon movement of the lever. As the lever 107 is raised, the cam 100 will move in a counterclockwise direction so that the lobe 104 will act against the receptacle 16 and move the receptacle to the right against the bias of the spring 50. Almost simultaneously, the lobe 106 will contact the stem 82 on the second poppet 78 to open the second poppet and drain any fluid pressure which may be present within the main bore to the left of the piston 58. Movement of the cam 100 will, due to the action of the lobe 104, move the receptacle sufficiently to the right so that the engagement balls are free to move into the large diameter area of the retaining sleeve 44.

Referring now to FIG. 2 wherein the male coupler 11 is shown coupled to the female coupler 10, it can be seen that the male coupler includes a check ball 108, a seat 110 for the check ball, a spring 112 urging the check ball toward the seat 110 and a stop member 114 which limits movement of the check ball 108 away from the seat 110. The male coupler member also includes a groove 116 in its outer surface and into which the engagement balls 42 will extend when the male coupler 11 is fully engaged within the female coupler 10. The male coupler 11 will typically be on the end of a hydraulic hose which leads to a hydraulic function remote from the housing 12.

When the female coupler 10 is not coupled to a coupler 11, the parts will all be in the position indicated in FIG. 1. That is, the receptacle will be positioned in its extreme left-hand position with the snap ring 52 abutting the shoulder 46, the main and secondary poppet valves will be closed and the resilient ball will be held in the area of the left-hand end of the land 90 within the bore 62. To connect a male coupler, an operator would lift the lever 107 to cause counterclockwise rotation of the cam 100. This rotation of the cam 100 causes the lobe 104 to engage the receptacle 16 and move it towards the right. Almost simultaneously the lobe 106 will contact the stem 82 on the secondary poppet valve 78 to open the same and relieve any fluid pressure that may be present at the left-hand end of the piston 58. The cam 100 is rotated until the receptacle 16 moves sufficiently to the right so that the balls 42 may move down the race 46 into the large diameter portion of the internal surface of the retaining sleeve 44. At this time, the male coupler 11 may be inserted into the engagement bore 18. Upon partial insertion of the male coupler 11 into the engagement bore 18, the projection 72 on the head 68 of the main poppet 66 will be engaged by the ball 108 in the male coupler and move the poppet 64 to the left to remove the valving surface from the seat 24 and open the passage 22. After a given movement of the main poppet 66 to the left, it engages the right-hand end of the rod 60 and moves the rod 60 along with the piston 58 to the left. Upon full insertion of the male coupler 11 into the engagement bore 18, the groove 116 in the male coupler will be aligned with the engagement balls 42. The operator may then release the lever 107 and the bias of the spring 50 acting on the snap ring 52 will then return the receptacle to the left. As the receptacle moves to the left, the balls 42 will ride up the race 46 to the small diameter portion of the internal surface of the retaining sleeve 44 and extend into the groove 116 to positively hold the male coupler 11 within the engagement bore.

To move the check valve 108 in the male coupler 11 off the seat 110, the operator must manipulate the control valve 30 to a position which permits pressurized fluid to flow through the passage 28 and the inlet ports 26 to the main bore 20. This fluid under pressure will pass through the passage 98 and/or between the stem 64 of the main poppet 66 and its bore to the bore 62. This fluid pressure acting on the resilient ball 92 will force the ball 92 against the bias of the spring 94 into the portion 88 of the bore 62 of enlarged diameter so that the fluid is free to flow past the ball 92 to the left-hand end of the piston 58. As the pressure builds up, the fluid pressure acting on the left-hand end of the piston 58 will be slightly less than the fluid pressure in a main bore to the right of the sleeve 54 because of a slight pressure drop caused by the bias of the spring 94. As fluid pressure builds up at the left-hand end of the piston 58, it will force the piston 58 along with the main poppet 66 to the right forcing the ball 108 off its seat until the piston 58 bottoms on sleeve 54. It should be noted that the sleeve 54, along with the sliding fit seal between the sleeve 54 and rod 60 prevents fluid pressure from acting on the right-hand side of the piston 58. Should any leakage occur, the fluid will be drained on through a passage 118 provided in end cap 36. When the piston 58 reaches its rightmost position, the fluid pressure at the left-hand end thereof acting on the ball 92 will increase until it, along with the force of the spring 94, can overcome the fluid pressure acting on the right-hand side of the ball 92 and return the ball 92 to its blocking position within the area of the bore 62 defined by the land 90.

The spring 96 acting on the ball 92 will prevent fluid pressure from escaping from the left-hand end of the piston 58 unless that pressure raises to a predetermined level above the fluid pressure within that portion of the bore 62 to the right of the ball 92. The retained pressure in the left-hand end of the main bore is sufficient to hold the check ball 100 of the main coupler off its seat 110 should the female coupler be subjected to a vacuum followed by a surge of pressure through the hose connected to the male coupler. However, should the pressure on the left-hand side of the piston 58 rise beyond an acceptable limit due to thermal expansion or otherwise, the pressure acting on the ball 92 will compress the spring 96 and force the ball to move into the enlarged diameter portion 86 of the bore 62 so that fluid can flow rightward around the ball 92 and relieve the excess pressure. As soon as the excess pressure is released, the spring 96 will force the ball 92 back into the area of the bore defined by the land 90.

The advantages of the female coupler, according to the present invention, can be readily seen by comparing it to the female coupler disclosed in the aforementioned co-pending U.S. application Ser. No. 491,519. In the coupler according to the present invention, the receptacle is made of two pieces which are screwed together for easy assembly. These two parts also act to clamp and hold a stop or sleeve in position within the main bore. This simple construction also makes the coupler very easy to disassemble for repair. In the coupler according to the prior application, the end cap was held in position by a snap ring and the stop or sleeve was also held in position by a snap ring. The snap rings, particularly the one for the sleeve which was located within the main bore made disassembly very difficult and time-consuming which, for all practical purposes, made the coupler unrepairable due to the expense.

In the coupler of the present invention, the main poppet 68 moves independently of the piston and rod 58, 60 and loosely slides within a short bore so that very little effort is needed to move the main poppet 66 to the closed position. This permits the use of a relatively light main poppet spring which reduces manufacturing costs and also reduces the force required to insert the male coupler 11 into the engagement bore. In the coupler disclosed in the aforementioned co-pending application, the main poppet was slidable within the sleeve and also within the piston and required a greater force to be moved to its closed position. Also, because of the numerous sliding parts with basically a fluid tight fit, the poppet, according to the aforementioned co-pending application, was subject to binding even though a relatively heavy spring was used to bias it towards the closed position.

Having just described a specific embodiment of the invention, various modifications within the spirit and scope of the invention will become apparent to those skilled in the art and can be made without departing from the underlying principles of the invention. Therefore, the invention should not be limited to the specific illustration and description, but only by the breath of the following claims.

I claim:

1. A female coupler for engagement with a male coupler having a check valve, said female coupler comprising:
    (a) a housing having a bore open at at least one end and a passage communicating with the bore at a location spaced from the open end;
    (b) a receptacle slidably positioned within the housing bore and having an engagement bore open to the open end of the housing bore for receiving a male coupler, a main bore spaced from the engagement bore, a passageway joining the engagement and main bores, an inlet port providing communication between the main bore and housing passage, and an outlet providing communication between the main bore and housing bore;
    (c) a piston having a rod extending from one side thereof slidably positioned within said main bore and dividing said main bore into a first chamber into which the rod extends and with which the inlet port and passageway communicates and a second chamber with which the outlet port communicates, said piston and rod having an additional bore extending therethrough from one chamber to the other;
    (d) a first poppet valve having a guidance portion slidable in said additional bore, a head portion in the first chamber for movement between positions opening and closing the passageway, and a projection extending from the head portion through the passageway;
    (e) a stop within the main bore between the piston and passageway;
    (f) a spring acting between the stop and first poppet valve urging the first poppet to a position closing the passageway;
    (g) a second poppet valve movable between open and closed positions for controlling flow through the outlet port; and
    (h) a flow check prevention valve positioned within said additional bore for controlling fluid flow through said additional bore by permitting fluid flow therethrough in one direction at a lower pressure than it permits fluid flow in the opposite direction.

2. The female coupler set forth in claim 1 wherein said receptacle is constructed of first and second parts, the first of said parts including the engagement bore, the passageway and a portion of the main bore, the second of said parts containing an additional portion of the main bore.

3. The female coupler set forth in claim 2 wherein the first part of the receptacle is open at an end opposite from the engagement bore, is provided with internal threads at its open end and has an internal shoulder at the inner end of the internal threads; the second part of the receptacle is open at one end which is provided with external threads and is threaded into the open end of the first part of the receptacle, the stop is a sleeve having an outwardly extending flange intermediate its ends which is clamped between the internal shoulder of the first part of the receptacle and an end of the second part of the receptacle which extends into the first part of the receptacle.

4. The female coupler set forth in claim 3 wherein the piston is slidably mounted in the second part of the receptacle for movement between a closed end thereof and the sleeve, and the rod slidably extends through the sleeve and into that portion of the main bore contained within the first part of the receptacle.

5. The female coupler as set forth in claim 4 wherein the inlet port is located in the first part of the receptacle and the outlet port is located in the closed end of the second part of the receptacle.

* * * * *